Patented Apr. 2, 1940

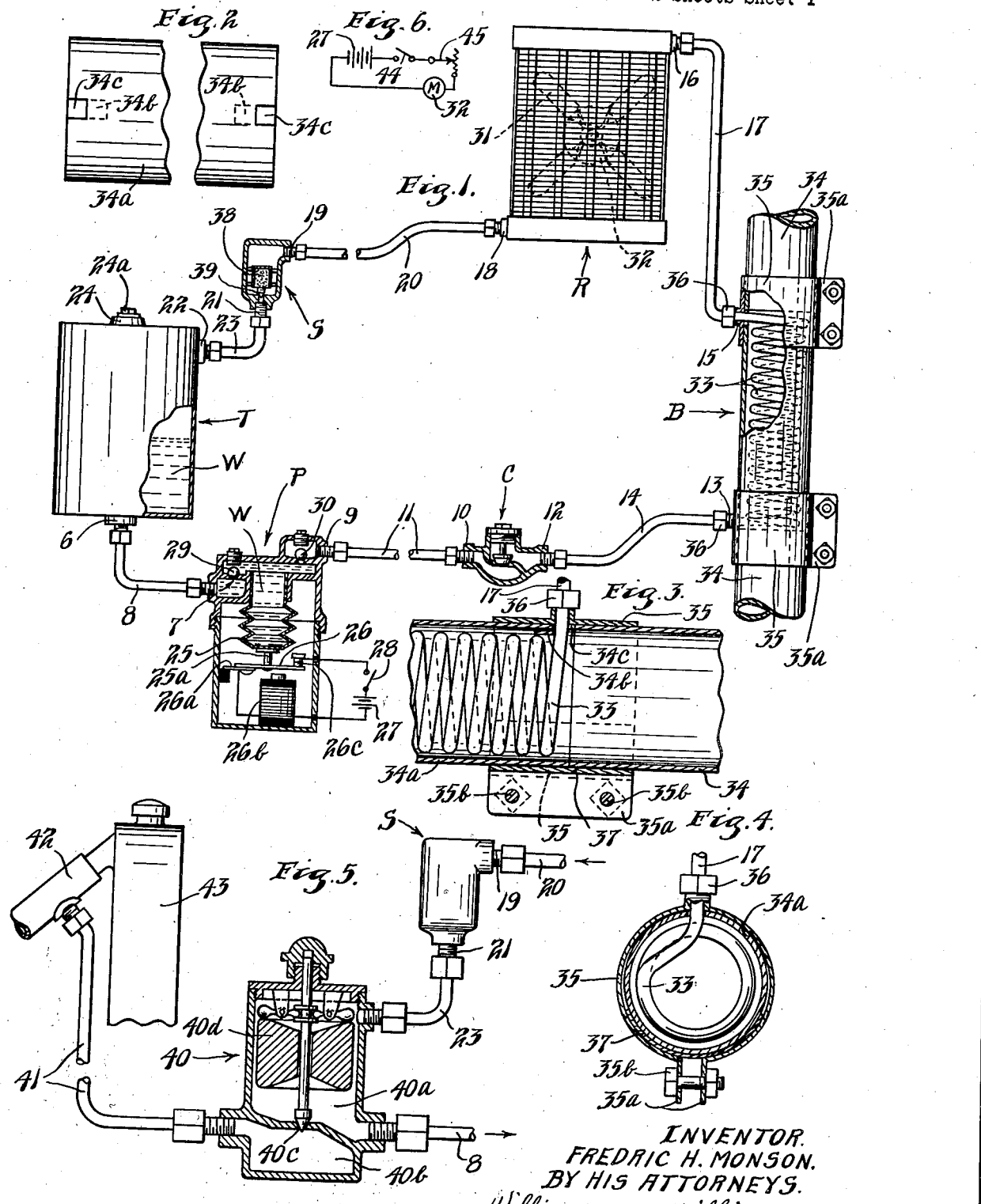

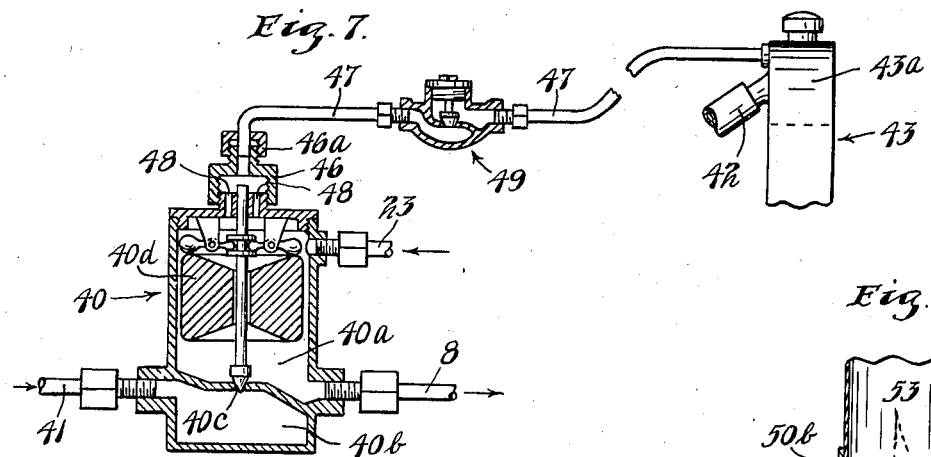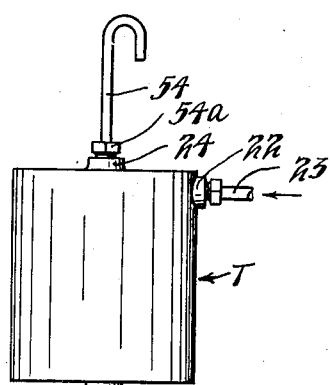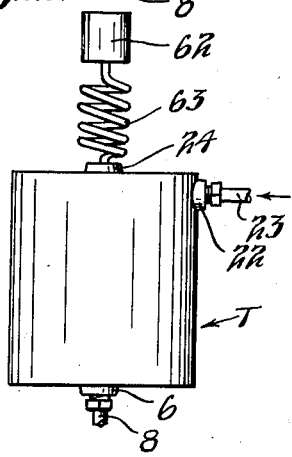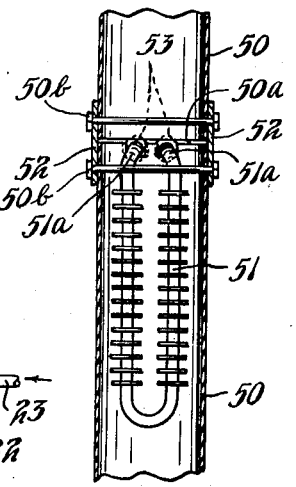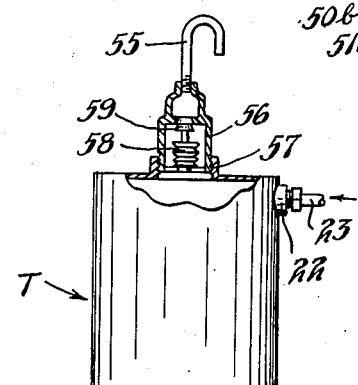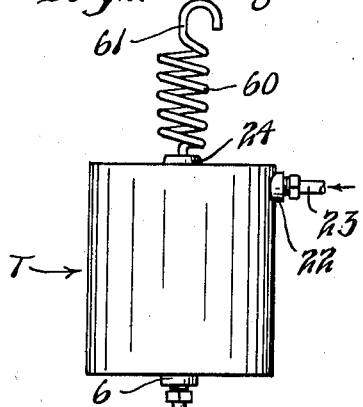

2,195,970

UNITED STATES PATENT OFFICE 2,195,970

STEAM HEATING SYSTEM FOR MOTOR VEHICLES

Fredric H. Monson, Minneapolis, Minn., assignor of one-half to John A. Elliott, Akron, Ohio Application September 5, 1936, Serial No. 99,575

3 Claims. (Cl. 237—12.3)

My invention relates to heating equipment for the interiors of motor vehicle bodies and particularly to such equipment utilizing steam as the heat conveying medium.

It is desirable that heaters for the passenger compartments of automotive vehicles be capable not only of producing heat in adequate quantity but also of very rapidly reaching heat producing condition after the engine of the vehicle has been started even though the engine and heating equipment were at a very low temperature prior to starting of the engine.

An object of my invention is to provide an improved automobile heating system capable of supplying an abundance of heat and attaining heat producing condition with great rapidity following the starting of the engine of the automobile.

Another object is to provide such a system wherein a quantity of vaporizable liquid is moved in a re-circulating manner by pumping means and wherein the rate of circulation is automatically varied in accordance with the amount of heat drawn from the system.

Still another object is to provide such a system wherein a boiler supplying heat to the heat conveying medium of the system is heated by hot exhaust gases discharged by the engine of the vehicle.

Yet another object is to provide such a boiler of ample steam generating capacity and of construction permitting easy and rapid installation thereof within the exhaust pipe of an automotive vehicle.

A further object is to provide such a heating system of simple, rugged, dependable, light, compact and inexpensive construction.

These and other objects and advantages of the invention will be more fully set forth in the following description made in connection with the accompanying drawings, wherein like characters refer to similar parts throughout the several views, and in which—

Fig. 1 is a partially broken away, partially sectional view of the elements of one form of my heating system and the conduits connecting said elements together;

Fig. 2 is a view of a portion of an exhaust pipe prepared for reception therein of the boiler of my system;

Fig. 3 is a partial longitudinal sectional view of the boiler of my system and a portion of an exhaust pipe wherein the boiler is installed;

Fig. 4 is a cross-sectional view of the boiler of my system and a portion of an exhaust pipe wherein said boiler is installed;

Fig. 5 is a partially broken away, partially sectional view of a portion of another form of my heating system;

Fig. 6 is an electrical connection diagram of the fan motor circuit of my system;

Fig. 7 is a partial view of a modification of the form of my system partially shown in Fig. 5;

Fig. 8 is a vertical sectional view of another form of the boiler of my system;

Fig. 9 is a view showing one form of venting means for the reservoir of my system;

Fig. 10 illustrates another form of venting means;

Fig. 11 illustrates still another form of venting means, and

Fig. 12 shows pressure reducing means for the reservoir of my system.

Referring to the drawings, and particularly to Fig. 1 thereof, my system consists, in general, of a boiler B, a fan-equipped radiator R, a steam trap S, a reservoir or tank T, a pump P, a check valve C and conduits connecting the various above mentioned units together. A heat conveying medium comprising a vaporizable liquid, such as water W, is contained within the system.

Each of the above mentioned units has both an inlet and an outlet. The outlet 6 at the lower end of the tank T is connected to the inlet 7 of the pump P by means of a conduit 8. The outlet 9 of the pump P is connected to the inlet 10 of the check valve C by means of a conduit 11. The outlet 12 of the check valve C is connected to the water inlet 13 of the lower end of the boiler B by means of a conduit 14. The steam outlet 15 at the upper end of the boiler B is connected to the steam inlet 16 of the radiator R by means of a conduit 17. The condensate outlet 18 of the radiator R is connected to the inlet 19 of the steam trap S by means of a conduit 20. The outlet 21 of the steam trap S is connected to the inlet 22 in the upper portion of the tank T by means of a conduit 23.

The tank T is provided at its upper end with a filler inlet 24 normally closed and sealed by a filler cap 24a. The tank T is without openings other than its inlet 22, outlet 6 and filler inlet 24.

The pump P may be any type of power operated pump capable of pumping liquid and arranged to automatically limit the pressure produced thereby at its outlet to a predetermined degree of pressure. The pump P shown in Fig. 1 is a simplified representation of a conventional automatic electrically operated gasoline pump frequently used in the fuel systems of automotive vehicles and known to the automotive industry as the "autopulse" fuel pump. The pump P shown includes a bellows 25 alternately compressed and distended by the armature 26 of an electric buzzer or vibrator mechanism including an armature supporting spring 26a, an electromagnetic coil 26b and electrical contacts 26c all associated in the same general manner as the corresponding parts of an ordinary electric buzzer. The armature 26 is mechanically connected to the movable lower end of the bellows 25 by means of a connecting element 25a. A battery 27, which may be the battery of the vehicle in which my system is installed, is connected to the above described vibrator mechanism through an electrical switch 28. The interior of the bellows 25 is in communication with the inlet 7 and outlet 8 of the pump respectively through a suction opened inlet valve 29 and a pressure opened outlet valve 30.

The magnetic pull of the electromagnet coil 26b on the armature 26 operates the pump P during its suction or intake event and tensions the armature spring 26a so that energy is stored in the spring. Energy stored in the spring 26a operates the pump during its expulsion event and hence the maximum pressure of which the pump P is capable obviously depends on the strength of the spring 26a.

The above described vibrator mechanism, if desired, may be connected to the electric generator (not shown) of a vehicle instead of to the battery. When the vibrator mechanism is connected to a generator having a cutout relay thereon, the connection is, of course, made at a point between the generator and the relay. With such a connection scheme cessation of pumping action occurs during periods when the engine is idling as a result of the cutout relay being open and the generator output being insufficient to operate the pump. Thus circulation of the heat conveying medium in the system is stopped at times when the heat content of the exhaust gases is insufficient for proper heating of the boiler B.

The check valve C is of a conventional type utilized in various types of plumbing systems and is arranged to permit flow of liquid from the outlet 9 of the pump P to the water inlet 13 of the boiler B and to prevent flow of liquid in the opposite direction. This check valve C is really auxiliary to the pump outlet valve 30 and may be omitted if desired. The check valve C however protects the pump P from heat by preventing back flow from the boiler B to the pump.

The radiator R is of the conventional type ordinarily used as the heat delivering unit of conventional hot water automobile heating systems and, in accordance with usual practice, is provided with a fan 31 driven by an electric motor 32. The motor 32 is, of course, adapted for connection, as shown in Fig. 6, to the battery 27 of an automobile electric system through a switch 44 or/and a rheostat 45 in the well-known manner. Obviously, the fan motor 32 and the vibrator mechanism of the pump P could be connected to the battery 27 of a vehicle through a common control means if desired instead of providing separate switches 28 and 44 as shown.

The boiler B consists primarily of a coil 33 of tubing disposed within the exhaust pipe 34 associated with the vehicle in which my system is installed. To install the boiler B in the exhaust pipe 34, the pipe is cut in two places so as to render removable a section 34a of the pipe slightly exceeding the coil 33 in length. The respective ends of the section 34a at longitudinally aligned points are provided with short parallel cuts so that ears 34b formed by the cuts may be bent back inside the pipe to leave outwardly opening notches 34c for receiving radial extensions of the tubing comprising the coil 33. These radial extensions respectively comprise the conduits 14 and 17 previously described.

The section 34a is then placed in its normal position in alignment with adjoining sections of the exhaust pipe 34 and suitable means is applied to seal and mechanically support the joints between the section 34a and said adjoining portions and to seal the exteriors of the conduits 14 and 17 to the exhaust pipe structure.

A pair of split clamping collars or bands 35 are provided each having apertured clamping ears 35a at the split therein and nutted clamping bolts 35b extending through the apertures in the ears 35a. One of the clamping collars 35 is placed on the exhaust pipe 34 and the exhaust pipe section 34a at each joint between the section 34a and the adjoining section of the pipe 34 so as to lap over onto each of the sections being joined. The clamping ears 35a are disposed diametrically opposite the points at which the tubes 14 and 17 extend outwardly of the section 34a and the collars 35 are each apertured and provided with a sealing gland 36 at the point where the conduits 14 and 17 must pass through the collar 35. The glands 36, when tightened on the conduits 14 and 17 serve both to seal the conduits 14 and 17 to the collars 35 and to support the coil 33 in proper position within the section 34a of the exhaust pipe 34. Strips 37, extending partly around the joints described above between the clamping collar 35 and the pipe sections 34 and 34a are positioned to bridge the gap in the collar 35 at the split therein. The collars 35 are, of course, drawn up tightly by means of the clamping bolts 35b so as to rigidly join the sections 34a to adjoining sections of the pipe 34 and, in co-operation with the strips 37, to seal the joints thus formed to prevent escape of exhaust gases from the exhaust pipe 34.

In the above described heating system it is preferable that the bottom of the radiator R be situated at a level at least as high as the inlet 22 of the tank T.

In normal operation of the above described heating system the vibrator mechanism of the pump P and the motor 32 of the fan 31 on the radiator R are connected to a source of electrical energy such as the battery 27 of the vehicle in which the system is installed. Water W is put in the system to fill the same up to such a level that the tank T will be approximately half full.

With the pump P in operation, water will be pumped from the tank T through the pump P, the check valve C, the boiler B, the radiator R and the steam trap S back into the tank T. The water, in passing through the boiler B will be converted into steam by heat absorbed therein from hot exhaust gases to which the coil 33 is exposed. This vaporized water or steam will pass through the conduit 17 into the upper end of and downwardly through the radiator to heat the radiator. Air blown through the air passages of the radiator by the fan 31 will be heated by the radiator. The transmission of heat from the steam in the radiator to the air passing through the radiator structure will condense this steam into water in liquid state. Condensate reaching the lower end of the radiator will flow through the conduit 20, the steam trap S and the conduit 23 into the tank T where the water will be available for repeated cycles of circulation thereof through the system in accordance with the above explanation. From the above it is apparent that a given quantity of water is in constant circulation through the system as long as the system is in operation. It should also be apparent that the system is sealed from the atmosphere so that none of the water in the system or any anti-freeze agent added to this water can escape.

When the fan 31 is turned off to stop or reduce delivery of heat from the radiator R, the flow of air through the radiator R ceases and radiation of heat from the radiator R will become relatively slight. Since little heat is being extracted from the steam in the radiator R, very little of the steam will be condensed and hence steam will reach the steam trap S to close the same. The higher temperature of the steam, as compared to the temperature of condensate, will expand the thermally expansive element 38 thereof to close the valve 39 thereof and thus prevent flow of steam through the steam trap S toward the tank T.

When the delivery of steam from the boiler B is substantially stopped by closure of the steam trap valve 39, the temperature and hence the pressure of the steam in the boiler B will tend to increase. Increase in pressure will be transmitted to the steam occupying the radiator R and will cause condensation of the same since the temperature of the same will be lower than the vaporizing temperature corresponding to an increased pressure. Such condensation, of course, acts to reduce pressure and affords at least partial compensation for the pressure increasing tendency of the steam within the boiler B. The increase in pressure following closure of the steam trap valve 39 will stop the pump P and thus prevent further delivery of water through the pump P to the boiler B. This automatic stopping action of the pump P is due to the fact that the force operating the pump bellows 25 during the compressing stroke thereof is obtained from energy stored in the armature spring 26a during the suction stroke. When the pressure within the bellows 25 reaches a value equal to or exceeding the pressure available from the spring 26a the bellows 25 will remain distended rather than proceed with another compression stroke. It should be noted that the contacts 26c are open under such conditions. The pumping action of the pump P will be resumed only when pressure in the boiler has been sufficiently reduced, as by starting the fan 31 to cause delivery of heat from the radiator R, so that the pressure in the bellows 25 of the pump P can be overcome by the tension in the armature spring 26a. From the above it should be apparent that the automatic pressure limiting characteristic of the pump P combined with the steam blocking action of the steam trap S automatically prevent the delivery of water to the boiler B at times other than when the radiator R is being used for delivery of heat therefrom. While the illustrated type of pump is highly satisfactory in my system, it should be obvious that any power driven pump having similar characteristics in regard to limiting of its output pressure could be used in substitution therefor.

The form of my system partially shown in Fig. 5 is identical with the form shown in Figs. 1 to 4 except that the reservoir or tank 40 of Fig. 5 has both a main chamber 40a, to the bottom and top of which the conduits 8 and 23 are respectively connected, and an auxiliary chamber 40b connected by means of a conduit 41 to the cooling system of the automobile in which the system is installed, as to the hose 42 connected to the top tank of the engine cooling radiator 43, as shown. Communication between the auxiliary chamber 40b and the main chamber 40a of the reservoir 40 is so controlled by a valve 40c actuated by a float 40d that water from the radiator 43 will be admitted to the main chamber 40a only at such times and in such quantity as to maintain the level of the water in the main chamber 40a at a predetermined level. The principle of operation of the system partially shown in Fig. 5 is identical with the operating principle explained above in connection with the system of Figs. 1 to 4.

In either of the above described forms of my heating system, the check valve C may be omitted and a single continuous conduit substituted for the same and the conduits 11 and 14.

Fig. 7 illustrates a modification of the form of my system partially shown in Fig. 5 and includes a vent conduit from the upper portion of the reservoir 40a to the uppermost part of the top tank 43a of the engine cooling radiator 43. For this purpose the cap 46 on the top of the reservoir is provided with a conduit connection element 46a from which a conduit 47 runs to the highest available portion of the top tank 43a of the radiator 43. The top wall of the reservoir 40 is provided with ducts 48 communicating between the respective interiors of the reservoir 40 and the cap 46. In cases where the connection of the conduit 47 to the radiator tank 43a must be made below the maximum water level in the tank 43a, a check valve 49 is connected in the conduit 47 as shown, the conduit 47 of course being severed to accommodate connection of the check valve 49. The check valve 49 is for the purpose of preventing flow of water from the radiator to the reservoir 40 and yet permitting air and vapor to vent from the reservoir 40 into the top radiator tank 43a. Where the conduit 47 can be connected to a portion of the radiator top tank 43a above the maximum water level therein the check valve 49 is omitted and the conduit 47 consists of a single uninterrupted conduit.

Fig. 8 illustrates a second form of my boiler. In this form the exhaust pipe 50 is cut at only one level as indicated by the numeral 50a. The heat exchanger element or boiler proper consists of a finned generally U-shaped tube 51 disposed within the exhaust pipe 50 below the cut 50a. Unfinned upper portions 51a of the tube are bent outwardly at a common level to form inlet and outlet conduits for the heat exchanger 51 extending substantially radially of the exhaust pipe 50 just below the cut 50a. The upper end of the portion of the exhaust pipe 50 below the cut 50a is notched to accommodate the inlet and outlet conduits 51a and permit extension of them to points outside of the exhaust pipe 50. A collar 52, similar to the collar 35 of the boiler of Figs. 1 and 3 except that two sealing glands 53, similar to the sealing glands 36 of Figs. 1 and 3, are provided for the two conduits 51a, is placed in encircling and clamping relation to the pipe 50 to overlap the respective portions of the pipe 50 adjoining the cut 50a and thus join and seal together the severed portions of the pipe 50. Nutted bolts 50b are extended diametrically through the collar 52 and pipe 50 in suitably apertured portions thereof respectively above and below the cut 50a so as to prevent longitudinal slippage of either portion of the pipe 50 relative to the collar 52.

Figs. 9 to 12 inclusive illustrate venting and pressure reducing means adapted to be substituted for the filler plug 24a of the reservoir T.

In Fig. 9 a plain vent tube 54, curved back upon itself at its upper end, is provided at its lower end with a fitting 54a by means of which it is mounted in the filler neck 24 of the reservoir T. The vent means thus formed provides for venting of air and release of pressure from the reservoir T.

Fig. 10 illustrates a form of vent so controlled by a thermostatically operated valve that the vent will be operative when the temperature at the valve is relatively low and will be closed when the temperature is relatively high. To this end a vent tube 55, generally similar to the vent tube 54 of Fig. 9 is mounted on the upper end of a hollow body 56 whose open lower end is mounted in an apertured bossed portion 57 of the upper wall of the reservoir T in sealed relation thereto. Within the body 56 is a thermostatic element such as the sylphon bellows element 58 connected to a valve 59 controlling movement of fluid from the lower to the upper portion of the body 56 and hence controlling the venting of the reservoir T through the vent tube 55. The thermostatic element 58 is arranged to keep the valve 59 closed as long as the temperature thereat is above a temperature slightly below the boiling point of alcohol (or any other kind of anti-freeze agent to be used). Obviously alcohol vapor cannot be vented from the reservoir T but during times when the temperature is low enough to cause opening of the valve 59, air may vent from the reservoir T.

Fig. 11 illustrates a form of venting means incorporating a condenser connected between a vent tube and the reservoir T. One end of a condenser such as the coiled tube condenser 60 is connected to the filler neck 24 of the reservoir T and the other end is connected to a vent tube 61 disposed thereabove. Air, of course, is free to vent through this vent means but, should alcohol vapor attempt to vent, such vapor will condense in the condenser 60 and return by gravity to the reservoir T.

Fig. 12 illustrates a pressure relieving means for use in connection with the reservoir T when alcohol or other easily vaporized anti-freeze liquids are employed. An air chamber 62 has only a single opening therein connected through a condenser 63 to the filler neck 24 of the reservoir T. The air contained in the chamber 62 comprises an air cushion for absorbing pressure appearing in the reservoir T. In cases where anti-freeze liquids such as alcohol solutions are used, an increase in pressure in the reservoir T will result in movement of air and vapor through the condenesr 63 toward the air chamber 62 to compress the air in the air chamber 62. Alcohol vapor moving into the condenser 63 will be condensed and will return by gravity to the reservoir T and the condensation of the alcohol vapor will tend to reduce the pressure in the reservoir T.

My heating system has been built and installed in an automobile, has been in practical operation under a wide range of conditions and has been found to be highly satisfactory. The system has been found to deliver warm air in substantial volume in much less than a minute after the engine of the vehicle has been started and to steadily deliver a large volume of hot air when in normal operation.

In the following claims the terms "water" and "steam" are intended to be construed to include any vaporizable liquid or combination of liquids and the vapor or vapors derived therefrom.

It is apparent that I have invented a novel, simple, compact, effective and easily installed heating system for the passenger compartment of an automobile body.

It will, of course, be understood that various changes may be made in the form, details, arrangement and proportions of the parts, without departing from the scope of my invention, which, generally stated, consists in a device capable of carrying out the objects above set forth, and in the novel parts and combinations of parts disclosed and defined in the appended claims.

What is claimed is:

1. A steam heating system for automotive vehicles comprising a boiler having a water inlet and a steam outlet, means for heating said boiler with hot exhaust gases from the engine of said vehicle, a radiator having a steam inlet and a condensate outlet, a valve having an inlet and an outlet and being responsive to temperature to close when subjected to steam and open when subjected to water, a liquid pump having an inlet and an outlet and constructed so as to become inoperative when a predetermined back pressure exists, and conduit means respectively connecting the outlet of said boiler to the inlet of said radiator, the outlet of said radiator to the inlet of said valve, the outlet of said valve to the inlet of said pump and the outlet of said pump to the inlet of said boiler, said system being adapted for partial filling thereof with vaporizable liquid.

2. A steam heating system for automotive vehicles comprising a boiler having a water inlet and steam outlet, means for heating said boiler with hot exhaust gases from the engine of said vehicle, a radiator having a steam inlet and a condensate outlet, a steam trap which will pass water and block steam and which has an inlet and an outlet, a power-driven liquid pump having an inlet and an outlet and designed to start and stop automatically responsive to the existence at its outlet of a predetermined back pressure, and conduit means respectively connecting the outlet of said boiler to the inlet of said radiator, the outlet of said radiator to the inlet of said trap, the outlet of said trap to the inlet of said pump and the outlet of said pump to the inlet of said boiler, said system being adapted for partial filling thereof with vaporizable liquid.

3. In a steam heating system for use with heat engines, a boiler arranged for generation of steam by heat from said engine, a reservoir and means for pumping water from the same through said boiler, a radiator and conduit means connecting the same with said boiler, together with conduit means connecting said radiator with said reservoir to return condensate thereto, and valve means connected in series with said conduit connecting the radiator and reservoir, said valve means being of a type arranged to close responsive to the presence of steam therein from said radiator and to open responsive to the presence therein of water from said radiator, said pumping means being arranged and constructed to stop pumping action automatically when a predetermined back pressure exists in said boiler.

FREDRIC H. MONSON.